(12) United States Patent
King (10) Patent No.: US 12,050,292 B2
(45) Date of Patent: Jul. 30, 2024

(54) RADIATION DETECTION DEVICE WITH DIRECTIONAL RADIATION DETECTOR

(71) Applicant: ATOMIC ENERGY OF CANADA LIMITED/ÉNERGIE ATOMIQUE DU CANADA LIMITÉE, Chalk River (CA)

(72) Inventor: James Mitchell King, Deep River (CA)

(73) Assignee: ATOMIC ENERGY OF CANADA LIMITED/ÉNERGIE ATOMIQUE DU CANADA LIMITÉE

( * ) Notice: Subject to any disclaimer, the term of this patent is extended or adjusted under 35 U.S.C. 154(b) by 315 days.

(21) Appl. No.: 17/600,028

(22) PCT Filed: Apr. 3, 2020

(86) PCT No.: PCT/CA2020/050446
§ 371 (c)(1),
(2) Date: Sep. 29, 2021

(87) PCT Pub. No.: WO2020/198877
PCT Pub. Date: Oct. 8, 2020

(65) Prior Publication Data
US 2022/0185473 A1    Jun. 16, 2022

Related U.S. Application Data

(60) Provisional application No. 62/829,095, filed on Apr. 4, 2019.

(51) Int. Cl.
*G01T 7/00* (2006.01)
*B64U 10/14* (2023.01)
(Continued)

(52) U.S. Cl.
CPC ............... *G01T 7/00* (2013.01); *B64U 10/14* (2023.01); *G01T 1/17* (2013.01); *B64U 2101/35* (2023.01)

(58) Field of Classification Search
CPC .. G01T 7/00; G01T 1/17; B64U 10/14; B64U 2101/35; B64U 2101/00; B64U 10/13; B64C 39/024; B64D 43/00
See application file for complete search history.

(56) References Cited

U.S. PATENT DOCUMENTS 2,952,774 A    9/1960   Howard
4,786,008 A    11/1988  Corbett
(Continued)

FOREIGN PATENT DOCUMENTS

CN    108860623 A    11/2018
WO      9531048 A1   11/1995

OTHER PUBLICATIONS

Nakada et al., Directional gamma ray imaging for unmanned aerial monitoring system, 2017, Proceedings of the 2017 IEEE/SICE Intenational Symposium on System Integration, pp. 475-480. (Year: 2017).*

(Continued)

*Primary Examiner* — Christine S. Kim
(74) *Attorney, Agent, or Firm* — Joseph C. Zucchero; Carolyn S. Elmore; Elmore Patent Law Group, P.C.

(57) ABSTRACT

The present disclosure relates to a radiation detection vehicle with a directional radiation detection system. The radiation detection vehicle may include a body, a motor supported by the body and configured to propel the vehicle, at least a first power source connectable to the body and configured to provide power to the vehicle, and a directional radiation detection system supported by the body. The directional radiation detection system may include a radiation detector configured to detect incident radiation and a directional shielding assembly configured to partially shield the radiation detector by preventing a portion of the incident radiation originating from a first incident direction from (Continued)

reaching the radiation detector, the directional shielding assembly including the first power source.

20 Claims, 8 Drawing Sheets

(51) Int. Cl.
   *G01T 1/17* (2006.01)
   *B64U 101/35* (2023.01)

(56) References Cited

U.S. PATENT DOCUMENTS

| | | |
|---|---|---|
| 5,335,366 A | 8/1994 | Daniels |
| 8,071,948 B2 | 12/2011 | Barnes et al. |
| 8,352,105 B2 | 1/2013 | Barnes et al. |
| 9,244,023 B2 | 1/2016 | Clemen |
| 9,261,605 B2 | 2/2016 | Sur et al. |
| 10,126,458 B2 | 11/2018 | Kulcinski et al. |
| 2016/0018532 A1 | 1/2016 | Scott et al. |
| 2017/0227669 A1* | 8/2017 | Kulcinski ............ G01V 5/0016 |
| 2018/0321399 A1 | 11/2018 | Newman |

OTHER PUBLICATIONS

Gao et al., Radiation effects on lithium metal batteries, Jun. 24, 2023, The innovation, vol. 4, pp. 1-9. (Year: 2023).*

Sato e tal., Remote radiation imaging system using a compact gamma ray imager mounted on a multicopter drone. 2018, Journal of Nuclear Science and Technology, vol. 55, pp. 90-96. (Year: 2018).*

* cited by examiner

PRIOR ART

FIG. 1

PRIOR ART

FIG. 2

PRIOR ART

RADIATION DETECTION DEVICE WITH DIRECTIONAL RADIATION DETECTOR

CROSS-REFERENCE TO RELATED APPLICATION

This application claims the benefit of earlier filed U.S. provisional application No. 62/829,095 filed Apr. 4, 2019 and entitled Radiation Detection Device with Directional Radiation Detector, the entirety of which is incorporated herein by reference.

FIELD

In one of its aspects, the present disclosure relates generally to radiation monitoring, and more particularly, to a vehicle (optionally an aerial vehicle) that includes a directional radiation detection system.

BACKGROUND

U.S. Pat. No. 9,244,023 discloses a system for monitoring radiation with a fuel-based liquid scintillant composition in which the fuel-scintillant composition may serve the dual purpose of a fuel to power an engine and a scintillator to detect radiation. The system may be configured to detect weak and/or distant radiation sources.

U.S. Pat. No. 8,071,948 discloses an aircraft having components of a radiation detection system integrated into the aircraft structure. The described radiation detection aircraft uses a scintillator material to form at least one component of the aircraft. The scintillator material can be coupled to a signal converter, which can be coupled to an accumulator, accumulating the light signal to determine radiation level. The accumulator may be coupled to a location system so that the signal may be coordinated to a specific location.

Similarly, U.S. Pat. No. 8,352,105 discloses an unmanned underwater vehicle that incorporates a structure having an integral scintillating material for radiation detection. The described vehicle has at least one structural member incorporating a scintillation material for a radiation detector and detection electronics connected to the radiation detector for measurement of the scintillation.

United States patent publication no. 2016/0018532 discloses a radiation detection device that is arranged to be physically associated with an unmanned vehicle. The described device comprises a data processor that receives position data from a position sensor and radiation data from a solid state radiation sensor, the position sensor and solid state radiation sensor being mounted on the unmanned vehicle. The data processor periodically associates the position data with the radiation data to form combined data, mapping radiation levels at particular locations.

U.S. Pat. No. 9,261,605 discloses a directional radiation detection apparatus for measuring both the intensity and direction of a radiation source. The described apparatus comprises a radiation sensor, an inverse collimator that shields the sensor from at least a portion of the incident radiation originating from the direction in which the inverse collimator is pointed, and a means for pointing the inverse collimator in different directions.

SUMMARY

There are situations where detailed information about radiation in large outdoor areas may be desired. This may occur for a variety of reasons such as regular monitoring of the environment around nuclear facilities, environmental monitoring, measurements taken in emergency conditions, and/or for security and monitoring purposes. In addition to the overall radiation levels in a given area, more localized information related to the location, extent/distribution, and magnitude of one or more radiation sources within an area may be of interest. For example, when surveying a relatively large area it may be desirable to be able to locate one or more relatively concentrated sources of radiation within the larger area.

The surveying and/or monitoring of an area may be done in any suitable manner, including, for example, with fixed sensors and preferably with one or more movable radiation detectors that can be moved through or around the area to be monitored. Radiation detectors may be mounted on vehicles to assist with their movement, and the vehicles may be aquatic, land-based, and/or aerial. In some environments, such as when it is desired to measure radiation levels across a relatively large, heterogeneous area, the use of flying vehicles may be preferred as it can reduce the challenges associated with a land-based vehicle traversing rough or blocked terrain. Flying or aerial vehicles may be manned or unmanned, and may be configured as fixed wing vehicles, rotary wing vehicles (i.e., helicopters), or other suitable configurations. When utilizing an aerial vehicle, the weight, overall size, volume, shape, and other mechanical aspects of the radiation detector design may be relevant design considerations and may have relatively more impact on the operation of the vehicle than a comparable radiation detector that is used on a land-based or aquatic (boat or submarine) vehicle.

For example, unmanned aerial vehicles (UAVs) offer one potential way to deliver radiation detectors and measuring equipment in large outdoor spaces. While UAVs can be an effective delivery method, they can also be limited with respect to the size and weight of the equipment they can reasonably carry. It may be desirable to have a means of efficiently obtaining airborne directional radiation measurements using lightweight equipment suitable for small or medium-sized UAVs. Such size and weight impacts may be relatively more significant when utilizing a relatively small UAV, as compared to utilizing a similar radiation detector on a relatively larger aircraft (such as a C-130 Hercules or the like), as the mass and size of the radiation detection apparatus may constitute a larger relative percent of the overall vehicle mass and size.

Non-directional radiation measuring can be understood to be based on using devices that can provide information regarding the strength of the radiation field at a given measurement point/location but that do not provide information regarding the location of the radiation source relative to the measurement point/location. Such directional information can be useful in some circumstances such as when trying to understand conditions and hazards, as the radiation level can be generally dependent on proximity to the radiation source.

One method of determining radiation conditions within a specific target area is to survey the area using a predetermined vehicle pattern, such as a grid pattern. Performing a full grid radiation survey over an area of interest can provide detailed information regarding the presence of radiation sources and the related radiation fields within the area. However, this can be time consuming and inefficient, especially over large areas. This may be particularly limiting in applications using electrically powered UAV delivery, where available flight times may be limited as compared to conventional aircraft. Furthermore, this method may not work well under changing conditions.

A survey can also be conducted by comparing the relative magnitudes and positions of radiation measurements and using this information to guide subsequent measurements. However, this technique can be prone to error, particularly if the radiation source is complex in nature. In addition, like the full grid radiation survey method, this technique may require a large number of measurement points to effectively define the radiation source and to confirm where no source is present. It also may not work well under changing conditions.

In contrast to methods using non-directional radiation detectors, an alternative approach can utilize vehicle-mounted directional radiation detectors—that is detectors that are strategically designed and utilize purposefully-positioned shielding to provide information regarding both the magnitude and the direction of a sensed radiation source. The shielding may take different forms, but in general can be understood to refer to the design of the apparatus to position a suitable shielding material between a radiation source and an associated detector, so that the shielding material can effectively block some radiation originating in a first direction from reaching the detector while allowing radiation originating from a different second direction to reach the detector for sensing/measurement. One example of such shielding can be designed with an opening that functions as a radiation inlet and allows radiation to reach the detector from a pre-defined direction. This arrangement can be called "collimated shielding". With collimated shielding, the radiation measurements from a detector can provide both magnitude and originating direction of the sensed radiation. A survey using collimated shielding can use the directional information to guide subsequent measurements. This may make surveying techniques relatively more effective and efficient as compared to using a non-directional detector. However, the use of collimated shielding can add complexity to the physical design of the detector and may tend to increase the size and weight of the required equipment (as material having the desired radiation shielding properties tends to be relatively dense). For portable systems, the added weight and size may make movement and maneuverability more difficult. This may be of relevance for UAV delivery, where adding weight for radiation shielding in addition to the operating components of the UAV itself may reduce the available flight time or make UAV delivery impractical.

A variation of collimated shielding, referred to as inverse collimation, is one in which shielding material is provided in only a limited area around the detector. This shielding is moved relative to the detector while readings of both the radiation magnitude and shielding position are recorded. The lowest radiation reading generally corresponds to when the shielding material is aligned between the detector and the radiation source. Inverse collimation can reduce the amount of shielding required as compared to standard collimation. However, the equipment required for inverse collimation can be more complex than a basic detector, as it can require the shielding, a drive system, and a means to control and track the shielding position versus the radiation measurement. Inverse collimation also requires processing of the data to invert it. In addition, the use of inverse collimation may be difficult when the radiation source is complex.

Other variations in the use of radiation detection equipment exist, such as simultaneously using multiple detectors, multiple shielded detectors, or using scattering techniques where individual radiation events are tracked between two adjacent detectors using time. However, systems that use multiple detectors are typically more complex, costly, and are of a larger size and weight than single detector systems.

Despite the advances made to date in the development of radiation detection devices, there is room for improvement to address the above-mentioned problems and shortcomings of the prior art.

Examples of a portable remotely-delivered directional radiation detector described herein are configured to take advantage of the possible radiation-blocking properties of some portions of a vehicle-adapted system and to repurpose such components to perform two or more functions in the system, which may include optimization of various components. Examples of components that may make up a radiation detector sensor package or system may include one or more radiation sensors, a microprocessor with data storage, position sensors, a radio transceiver, shielding, and a housing. The size and weight of each component is preferably balanced to maximize performance and efficiency while minimizing total weight of the apparatus. Weight can be a significant consideration when designing a portable, remotely-delivered directional radiation detector. For example, added weight can result in shortened available flight times when using a UAV delivery method and may even make remote delivery impractical. For radiation detection, an additional consideration is that detector sensitivity and efficiency can be directly proportional to the size of the detector. A larger detector may be able to measure radiation more quickly and accurately than a smaller detector of the same type. Therefore, reducing the size and weight of each component in the detector package, while still providing a desired functionality and performance, can be an important consideration.

There may be one or more aspects of the teachings described herein that may help obviate or mitigate at least one of the above-mentioned disadvantages of the prior art, and to provide a novel radiation detection vehicle and a novel directional radiation detection system.

The teachings described herein may, in one broad aspect, relate to a radiation detection vehicle, the radiation detection vehicle may include (a) a body; (b) a motor supported by the body and configured to propel the vehicle; (c) at least a first power source connectable to the body and configured to provide power to the vehicle. A directional radiation detection system supported by the body may include (i) a radiation detector configured to detect incident radiation; and (ii) a directional shielding assembly configured to partially shield the radiation detector by preventing a portion of the incident radiation originating from a first incident direction from reaching the radiation detector, the directional shielding assembly may include the first power source.

The first power source may provide power to at least one of the motor for driving the motor to propel the vehicle and the directional radiation detection system.

The first power source may include between about 5% and about 25% of the mass of the vehicle.

The first power source may be the only source of power to the motor.

The first power source may be the only source of power to the vehicle.

The first power source may include at least a first battery and a second battery.

At least one of the first battery and the second battery may be detachably connected to the body.

The at least one of the first battery and the second battery that is detachably connected to the body may be detachable independently of the other one of the first battery and the second battery.

The at least one of the first battery and the second battery that is detachably connected to the body may be detachable while the radiation detector remains connected to the body.

A third battery may be connectable to the body in place of the at least one of the first battery and the second battery that is detachably connected to the body while the other of the at least one of the first battery and the second battery remains connected to the body. When the third battery is connected to the body, the directional shielding assembly may include the third battery.

The directional shielding assembly may be configured as a collimator having a radiation inlet that allows incident radiation passing through the radiation inlet to reach the radiation detector and that shields the radiation detector by attenuating incident radiation that passes through the first power source and does not pass through the radiation inlet.

The directional shielding assembly extends along a collimator axis, and the radiation detector is at one end of the collimator and the radiation inlet comprises a lateral portion that is axially opposite the radiation detector.

The lateral portion may extend in a plane that is transverse the collimator axis. The directional shielding assembly may laterally surround the collimator axis thereby blocking incident radiation that does not travel through the lateral portion.

The vehicle may have a front side, an opposing rear side, and left and right sides. The first battery may be disposed toward the front side, the second battery may be disposed toward the rear side, and the directional shielding assembly may include a third battery disposed toward the left side and a fourth battery disposed toward the right side, and wherein the first, second, third, and fourth batteries co-operate to laterally surround the collimator axis.

The directional shielding assembly may only partially laterally surround the collimator axis and the radiation inlet may include an axial portion lying in a plane that is generally parallel to the collimator axis, extends axially from the lateral portion and may be defined by a gap in the directional radiation shielding assembly. The directional shielding assembly may block incident radiation that does not travel through at least one of the lateral portion and the axial portion of the radiation inlet.

The directional shielding assembly may be configured as an inverse collimator in which the first power source may be configured as a blocking member that may be movable relative to the radiation detector and that shields the radiation detector by attenuating incident radiation originating from a direction in which the blocking member is pointed.

The vehicle may be an aerial vehicle and the body may have an upper side and an opposed lower side generally facing the ground when the aerial vehicle is in flight. The directional radiation detection system may be provided on the lower side and may be generally downwardly facing.

The radiation may be proximate the lower side and may face the ground and the directional shielding assembly may extend away from the lower side and below the radiation detector when the aerial vehicle is in flight.

The vehicle may include an unmanned aerial drone.

The directional radiation detection system may contain a center of gravity of the vehicle.

The vehicle may also include a sensor system to monitor an instantaneous position of the vehicle when in use and a controller operable to associate an instantaneous directional radiation measurement with the instantaneous position of the vehicle.

The radiation detector may include a solid state material that emits an electrical signal in response to the incident radiation or a scintillating material that emits light in response to incident radiation.

The teachings described herein may, in another broad aspect, relate to a directional radiation detection system for use in combination with a vehicle, the directional radiation detection system including: (a) a radiation detector configured to detect incident radiation; and (b) a directional shielding assembly configured to partially shield the radiation detector by preventing a portion of the incident radiation originating from a first incident direction from reaching the radiation detector. The directional shielding assembly may include at least a first power source that is configured to provide power to the vehicle.

Other aspects of the teachings described herein, which may be used in combination with any other aspect, including the two broad aspects listed above, may include that the first power source may provide power to at least one of the motor for driving the motor to propel the vehicle and the directional radiation detection system.

The first power source may include between about 5% and about 25% of the mass of the vehicle.

The first power source may be the only source of power to the motor.

The first power source may be the only source of power to the vehicle.

The first power source may include at least a first battery and a second battery.

At least one of the first battery and the second battery may be detachably connected to the body.

The at least one of the first battery and the second battery that may be detachably connected to the body may be detachable independently of the other one of the first battery and the second battery.

The at least one of the first battery and the second battery that may be detachably connected to the body may be detachable while the radiation detector remains connected to the body.

There may be a third battery that may be connectable to the body in place of the at least one of the first battery and the second battery that may be detachably connected to the body while the other of the at least one of the first battery and the second battery remains connected to the body. When the third battery is connected to the body, the directional shielding assembly may include the third battery.

The directional shielding assembly may be configured as a collimator having a radiation inlet that allows incident radiation passing through the radiation inlet to reach the radiation detector and that shields the radiation detector by attenuating incident radiation that passes through the first power source and does not pass through the radiation inlet.

The directional shielding assembly may extend along a collimator axis, with the radiation detector at one end of the collimator and the radiation inlet may include a lateral portion that may be axially opposite the radiation detector.

The lateral portion may extend in a plane that is transverse the collimator axis. The directional shielding assembly may laterally surround the collimator axis thereby blocking incident radiation that does not travel through the lateral portion.

The vehicle may have a front side, an opposing rear side, and left and right sides. The first battery may be disposed toward the front side, the second battery may be disposed toward the rear side, and the directional shielding assembly may include a third battery disposed toward the left side and fourth battery disposed toward the right side. The first, second, third, and fourth batteries may co-operate to laterally surround the collimator axis.

The directional shielding assembly may only partially laterally surround the collimator axis. The radiation inlet may include an axial portion lying in a plane that is generally parallel to the collimator axis, extending axially from the lateral portion and being defined by a gap in directional radiation shielding assembly. The directional shielding assembly may block incident radiation that does not travel through at least one of the lateral portion and the axial portion of the radiation inlet.

The directional shielding assembly may be configured as an inverse collimator in which the first power source may be configured as a blocking member that may be movable relative to the radiation detector and that may shield the radiation detector by attenuating incident radiation originating from a direction in which the blocking member is pointed.

The vehicle may be an aerial vehicle. The body may have an upper side and an opposed lower side generally facing the ground when the aerial vehicle is in flight. A directional radiation detection system may be provided on the lower side and may be generally downwardly facing.

The radiation detector may be proximate the lower side and may face the ground. The directional shielding assembly may extend away from the lower side and below the radiation detector when the aerial vehicle is in flight.

The vehicle may include an unmanned aerial drone.

The directional radiation detection system may contain a center of gravity of the vehicle.

The vehicle may further include a sensor system to monitor an instantaneous position of the vehicle when in use. The vehicle may also further include a controller operable to associate an instantaneous directional radiation measurement with the instantaneous position of the vehicle. For example, a GPS system may be used to provide 'X and Y' positions of the vehicle and an altimeter may be used to determine the height of an aerial vehicle. It may be generally assumed that the vehicle is nominally upright, so the rotary positions about the X and Y axes can be assumed to be substantially fixed. The rotary position about a generally vertical "Z" axis can then be used to help determine the direction the vehicle is facing. This can be monitored using any suitable apparatus, such as electronic compass or magnetometer.

The radiation detector may include a solid-state material that emits an electrical signal in response to the incident radiation or a scintillating material that emits light in response to incident radiation.

The vehicle may include a body and a motor supported by the body. The motor may be configured to propel the vehicle. The at least first power source may be configured to provide power to the motor to propel the vehicle when in use.

Thus, the teachings described herein involves a directional radiation detection system for use in combination with a vehicle and a radiation detection vehicle that can include the same. The directional radiation detection system may include a radiation detector and a directional shielding assembly. The directional shielding assembly may include at least a first power source configured to provide power to the vehicle. The use of a power source as shielding allows for the utilization of shielding without a net weight penalty for carrying additional mass, as the power source is already required as part of the vehicle. This multi-purposed material approach may allow for an efficient, lightweight, highly portable means for obtaining directional radiation measurements, thereby increasing the feasibility and efficiency of using shielding in vehicle-delivered radiation sensing. This may be particularly true for directional radiation monitoring using small and medium sized UAVs, as opposed to that using a large vehicle (such as a large UAV), a helicopter, or a ground-based vehicle for delivery of a radiation detection device. Due to their high portability, the present directional radiation detection system and radiation detection vehicle are believed to have application in regular monitoring around nuclear facilities, nuclear emergency response, military applications, environmental monitoring, security, and the like.

To the knowledge of the inventor, a radiation detection vehicle and a directional radiation detection system with such a combination of features is heretofore unknown.

Other advantages of the invention will become apparent to those of skill in the art upon reviewing the present specification.

BRIEF DESCRIPTION OF THE DRAWINGS

Embodiments of the present invention will be described with reference to the accompanying drawings, wherein like reference numerals denote like parts, and in which.

DETAILED DESCRIPTION OF THE PREFERRED EMBODIMENTS

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Radiation detection devices can be used to monitor and detect sources of radiation. In addition to radiation levels, such devices may also provide information relating to the location, extent, and magnitude of radiation sources that may be of interest.

UAVs offer one way in which radiation measuring equipment can be delivered in large spaces, and particularly in large outdoor spaces.

Figure 1:
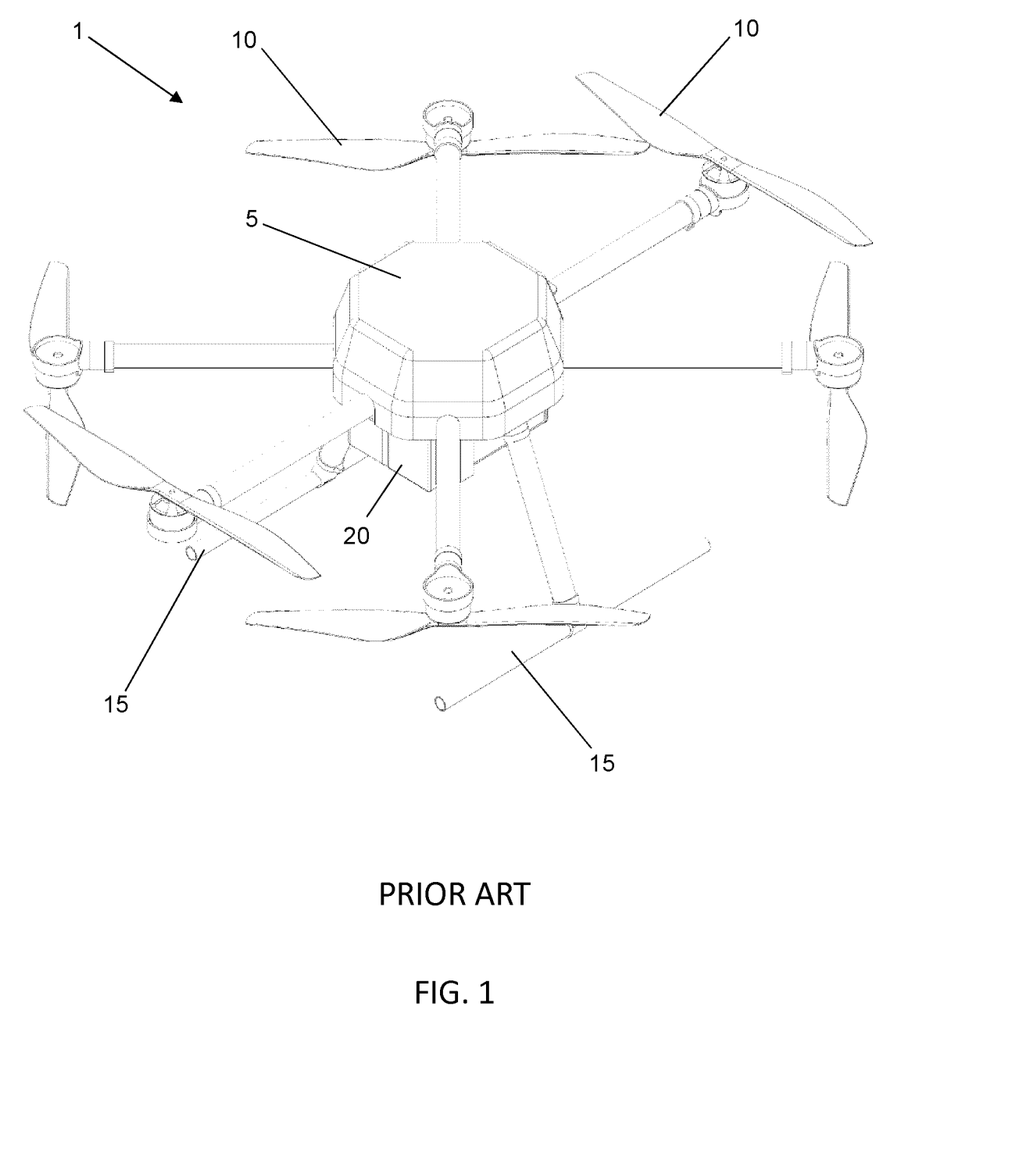
FIG. 1 is an isometric view of a typical unmanned aerial vehicle.
Figure 2:
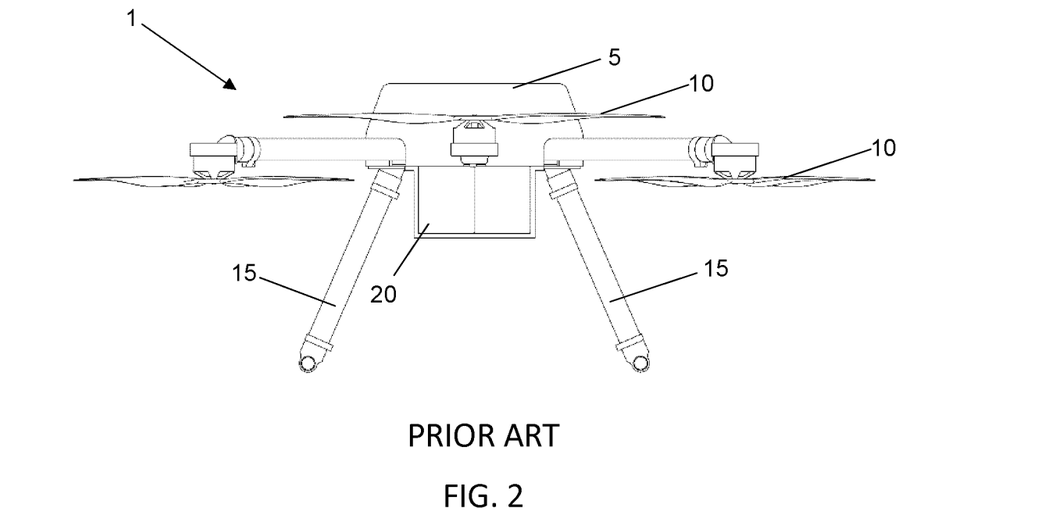
FIG. 2 is a front view of the unmanned aerial vehicle of FIG. 1.

FIGS. 1 and 2 are representations of one example of a typical UAV. The illustrated UAV 1 has a body 5, a series of propellers 10, and a set of landing gear 15. Batteries 20 are mounted directly below the body 5. The batteries 20 are of a standard configuration and are used to provide electrical power to the UAV 1, for example to power the propellers 10 along with other onboard systems (control, navigation, etc.). In this example, the batteries 20 provide all the power to the UAV 1.

Figure 3:
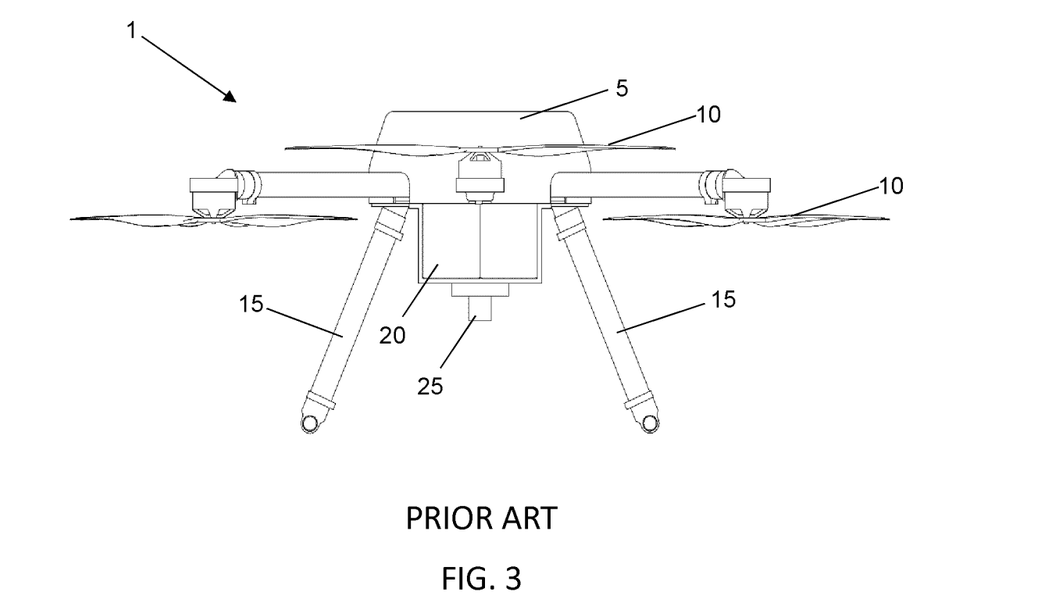
FIG. 3 is a front view of the unmanned aerial vehicle of FIG. 1, onto which a radiation detector has been mounted.

FIG. 3 is an example of an adaptation of the UAV illustrated in FIGS. 1 and 2 for use in radiation detection activities. In this arrangement, a radiation detector is mounted to the UAV and in this example, the radiation detector 25 is mounted to the bottom of the UAV 1, directly below the batteries 20. As can be seen in FIG. 3, the radiation detector does not have directional shielding surrounding it and is therefore sensitive to radiation from any direction below the UAV 1. This arrangement would provide non-directional radiation sensing capabilities. If directional radiation sensing were desired, a conventional approach would be to attach additional radiation shielding materials to the UAV 1.

However, in contrast to this conventional approach, the inventor has developed a new design for a directional radiation detection system that includes both a radiation detector configured to detect incident radiation and a directional shielding assembly that is configured to at least partially shield the radiation detector by preventing a portion of the incident radiation originating from a first incident direction from reaching the radiation detector and in which the directional shielding assembly includes at least one functional component of the vehicle (e.g., a UAV) that has been reconfigured and/or repurposed to perform at least two functions—its originally intended function and a radiation shielding function. For example, the directional radiation detection system can include shielding that is provided by changing the configuration and/or location of an existing vehicle component so that it is in a different arrangement than is conventionally used to perform its original function (and optionally in a manner that would not be desirable/required merely to perform its original function) so that it can simultaneously perform a secondary, radiation blocking/shielding function. For example, an existing vehicle component may be oversized, shaped, positioned, or oriented differently than would be done to achieve its primary function to help provide a secondary function. This reconfiguration is preferably done purposefully to achieve its radiation shielding function at a desired level and is not mere coincidence or an intermittent effect that is the result of a transient changes in vehicle position/orientation or other uncoordinated effects.

One example of such a repurposing is the physical reconfiguration of the battery(ies) or other aspects of a vehicle's onboard power source (which may include a plurality of individual battery cells, capacitors, and the like) to provide a desired shielding geometry/configuration, while still providing electrical power to the vehicle. The desired arrangements for providing radiation shielding may be unnecessary for the provision of sufficient electrical power to the vehicle, and may include making batteries that are shaped differently, somewhat oversized for a given electrical demand, oriented differently, or otherwise connected to the vehicle in a manner that does not necessarily reduce the overall volume and/or weight of the vehicle or UAV. However, by using the batteries or other power source component for two purposes—power supply and shielding—the total size and/or net weight of the vehicle or UAV may be reduced as compared to a more conventional vehicle arrangement as the need for separate power source and shielding material can be at least partially reduced. Preferably, substantially all of the desired radiation shielding can be provided by the power source/battery components, such that the combined mass of the vehicle power source(s) and its onboard radiation shielding material (i.e., $m_{battery}+m_{shield}$) is preferably equal to or substantially equal to the mass of the vehicle power source(s) ($m_{battery}$) because of the overlap in function. Put another way, arranging the battery materials to provide a desired degree of radiation shielding may preferably be achieved without increasing the overall mass of the vehicle through the inclusion of relatively heavy shielding material that does not otherwise contribute to the operation of the vehicle.

Figure 4:
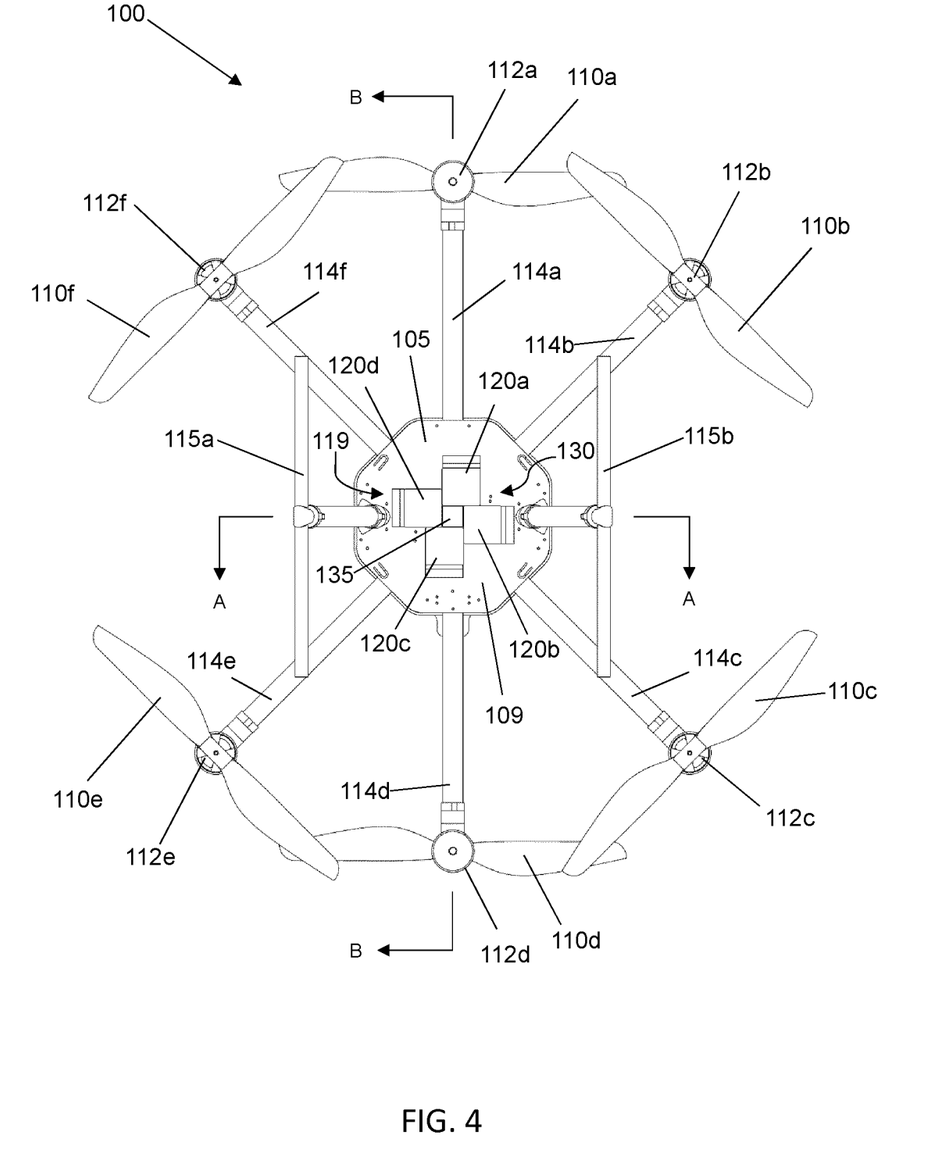
FIG. 4 is a bottom view of one example of a radiation detection vehicle with a directional radiation detection system.
Figure 5:
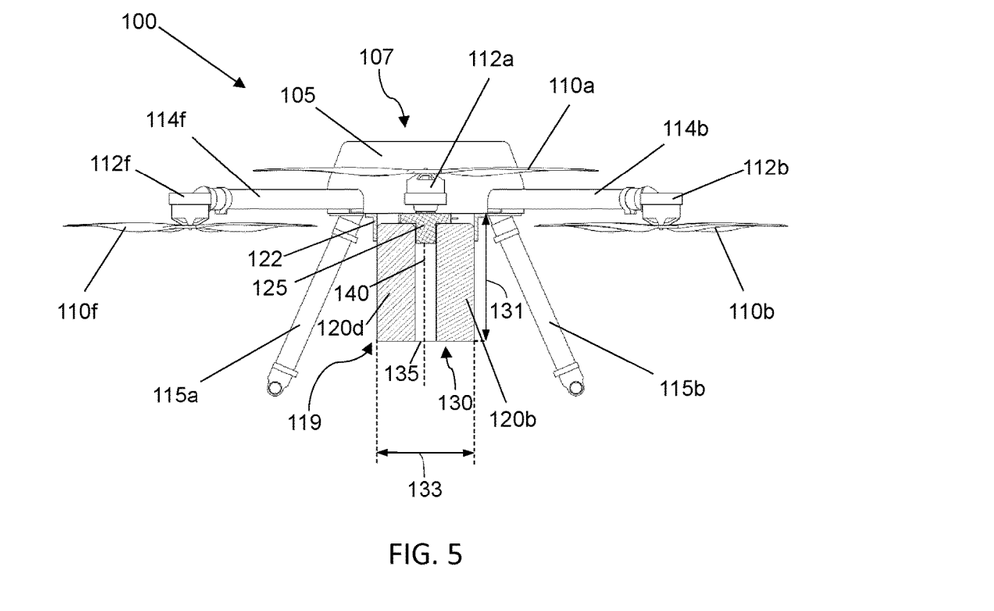
FIG. 5 is a front view of the radiation detection vehicle of FIG. 4, taken along line A-A, wherein a partial cross-section of the radiation detection system is shown.
Figure 6:
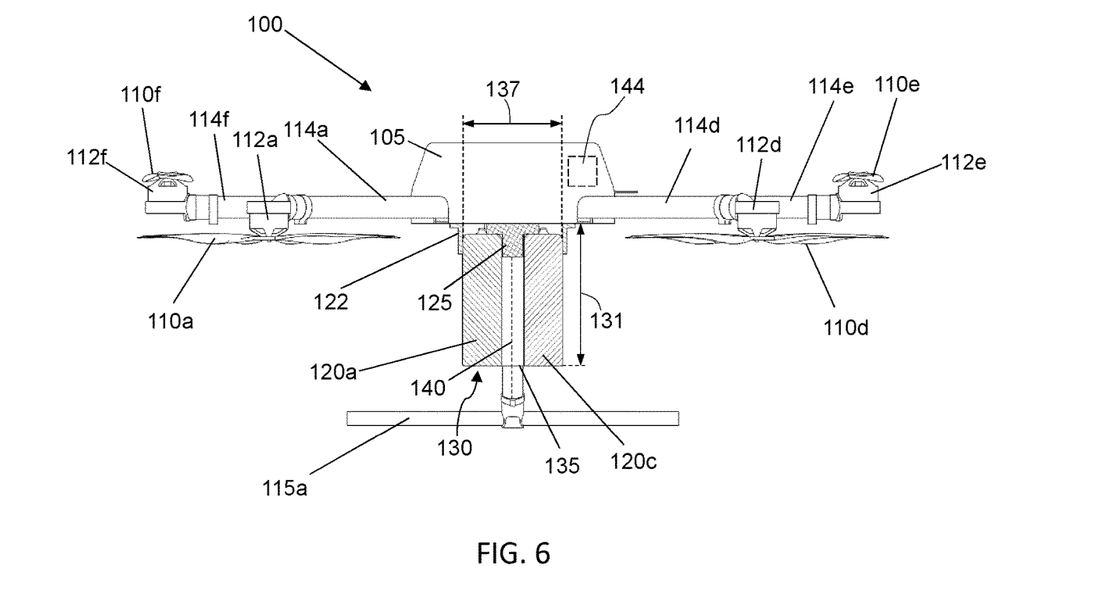
FIG. 6 is a side view of the radiation detection vehicle of FIG. 4, taken along line B-B, wherein a partial cross-section of the radiation detection system is shown.

Referring to FIGS. 4 to 6, one example of a present radiation detection vehicle 100 with a directional radiation detection system 130 is shown. The radiation detection vehicle 100 in this example may be operated to obtain directional radiation measurements from a target surface or area, for example by flying the radiation detection vehicle 100 over the area where measurements are to be taken.

In the illustrated embodiment, the radiation detection vehicle 100 is an aerial vehicle or a UAV. It includes a body 105 that has an upper side 107 (FIG. 5) that is intended to be generally upwardly facing when the radiation detection vehicle 100 is in use, and a generally opposed lower side 109 (FIG. 4) that is intended to generally face downwardly (i.e., toward the ground) when the vehicle 100 is in flight. The body 105 in this example has a generally convex octagonal configuration but may be any suitable shape that allows a given embodiment to support other desired components of the radiation detection vehicle 100 (such as the controller, GPS/altimeter module, compass, communications module, and the like) while still being functional as a UAV. In this example, the radiation detection vehicle is illustrated as a multi-copter, rotary-wing type UAV, but in other embodiments it may have a different configuration and may be of a fixed-wing and/or of a manned design.

The radiation detection vehicle 100 preferably includes a suitable landing gear arrangement, such as landing gear component 115 that extends down and away from the body 105, to help facilitate landing of the radiation detection vehicle 100 when desired without damaging or otherwise interfering with any portions of the vehicle 100 that extend downwardly from the lower side 109. In the illustrated embodiment, the landing gear component includes a pair of legs 115a, 115b that are spaced apart from each other on opposing sides of the body 105, and also on opposing sides of the directional radiation detection system 130.

The radiation detection vehicle 100 preferably includes at least one motor or plurality of motors that are supported by the body 105 and can be configured to provide locomotive power to the vehicle 100 to help move the vehicle 100 along its desired course. The nature of the motor(s) may be based on the type of propulsion apparatus used by the vehicle. For example, the motor or motors may drive one or more propellers, turbines, wheels, gearing trains and transmissions, or other such power train components. The radiation vehicle may be a single rotor vehicle with one propeller or may be a multi-rotor vehicle with two or more propellers. The number of motors and propellers may vary based on a several factors, including the size, shape, weight, and range of the vehicle.

In some embodiments, each motor is paired to a different propeller to which it provides power to. In other embodiments, one motor may provide power to multiple propellers. The motor(s) and propeller(s) may be mounted directly on the body of the vehicle or may be secured to the body via an arm, which extends away from the body. The motor and its associated propeller may be mounted together or may be mounted apart. For example, a motor and the propeller it powers may be mounted together on an arm. Conversely, a motor may be mounted on the body and the propeller may be attached to an arm. The length and shape of the arm(s) may vary based on a several factors, including the size, shape, and weight of the vehicle, motor(s), and/or propeller(s).

Referring to FIGS. 4-6, in the illustrated embodiment, the radiation detection vehicle 100 has six motors 112a-f. Each motor 112a-f is configured to power a propeller 110a-f, which in turn propels the vehicle 100. Each motor-propeller combination is secured to the body 105 by an arm 114a-f, each arm extending away from the body. The motor 112 and propeller 110 are attached to the arm 114 at the distal end, relative to the body 105.

In the illustrated example, the motors 112a-f are electric motors. The radiation detection vehicle 100 therefore includes at least a first power source that is connectable to the body and configured to provide power to the vehicle 100, and optionally can provide power to the motors 112a-f. The motors 112a-f may all be powered by a common power source, or two or more power sources may provide power to different motors 112a-f. Optionally, the source that provides power to the motors 112a-f can also provide power to other components of the vehicle 100. This may help reduce the overall number of separate power sources needed for a given vehicle 100. Alternatively, the power source for the motors 112a-f may be separate (either electrically, physically, or both) from the power source that powers other vehicle components. This may allow different components to receive different types/levels of power and may allow some vehicle control or telemetry systems to continue to operate even if the power source for the motors 112a-f is depleted. The motors 112a-f may be any suitable type of electric motor, including DC motors (which may be convenient if the onboard power source provides DC power) or AC motors. The size and power of each motor 112a-f can be selected based on other operating parameters of the vehicle 100, and the motors 112a-f may be the same or different from each other.

The radiation detection vehicle 100 in this example also includes a directional radiation detection system 130 that is supported by the body 105. In some embodiments, the radiation detection system 130 is preferably provided on the lower side 109 of the body 105 and is generally downwardly facing. In some embodiments, the directional radiation detection system 130 faces the ground when the vehicle 100 is in use. This may be useful if the vehicle 100 is intended to make an aerial survey of the underlying ground/region. Alternatively, instead of being disposed on the lower side 109 of the body 105, the directional radiation detection system 130 may be positioned on one side of the body 105 and/or may extend substantially through the body 105 while still be configured to face/sense radiation that originates from generally below the vehicle 100 while the vehicle is in flight.

In other embodiments, the directional radiation detection system 130 may be configured to face/sense radiation from a different direction (such as the front or back of the vehicle 100 if it is intended to survey a generally vertically oriented region—such as a building, ship, or other structure while in flight).

In this example, the directional radiation detection system 130 includes a radiation detector 125 that is configured to detect incident radiation and a directional shielding assembly 120. The detector 125 itself may be considered non-directional in the absence of an associated shielding assembly. The detector 125 may be any suitable type of transducer and in some embodiments, may include a solid-state material that emits an electrical signal in response to incident radiation. For example, the radiation detector may be any suitable radiation detector, and may be, for example, a C12137 series radiation detection module sold by Hamamatsu Photonics KK. Alternatively, the detector 125 may be a scintillator type detector that emits light in response to incident radiation, accompanied by a photodetector or other suitable hardware to generate an electrical signal that is proportional to the amount of light generated.

In some embodiments, the directional shielding assembly 120 can be configured to extend away from the lower side 109 of the body 105. In some embodiments, the directional shielding assembly 120 can be positioned below the radiation detector when the vehicle 100 is in use. In embodiments in which the vehicle is an aerial vehicle, the directional shielding assembly 120 may extend below the radiation detector 125 when the aerial vehicle 100 is in flight and may substantially or entirely laterally surround the radiation detector 125. The upper side of the radiation detector 125 (e.g., the side that is expected to be facing away from the area in which radiation measurements are to be taken) may be shielded in a similar manner and/or may not require substantial radiation shielding.

The directional shielding assembly 120 is preferably configured to at least partially shield the radiation detector 125 by preventing a portion of the incident radiation originating from a first incident direction from reaching the radiation detector 125. In some embodiments, the directional shielding assembly 120 may include at least a portion of the first power source that provides power to the UAV.

In particular, the directional shielding assembly 120 may include one or more battery cells or other energy storage components/materials that are sufficiently dense to operate as a useful radiation shield. For example, batteries included in the first power source may contain lithium, cadmium, nickel, and other materials that can block one or more types of incident radiation (for example, gamma radiation) in a manner that is analogous to the shielding provided by lead or other conventional shield materials, while still functioning as a power source.

In some embodiments, the first power source may be the power source that provides power to one or more motors to drive the motor or motors to propel the vehicle 100. Alternatively, or in addition to, the first power source may provide power to the radiation detection system 130 itself or to other vehicle components. In some embodiments, the first power source that is included in the directional shielding assembly 120 can be the only source of power to the motor or motors and preferably may be the only source of power to the vehicle 100. This may help reduce the overall size and mass of the vehicle 100 by eliminating the need to include batteries that are not incorporated into the directional shielding assembly 120 and/or the need to include shielding material that does not also function as a power source.

In some embodiments, the first power source may include one battery. In other embodiments, the first power source may include more than one battery and/or more than one individual power cell. Optionally, the batteries forming the power source may be rechargeable and/or may be replaceable to provide a fresh power source to the vehicle 100 when needed. Optionally, to help facilitate the changing and/or replacement of a spent power source, the power source in its entirety, or individual batteries or sub-modules thereof, may be detachable from the rest of the vehicle 100. This may allow a discharged power source to be removed and replaced with a new, charged power source. This may help reduce the time required to return the vehicle 100 into service if its initial battery runs low. In such configurations, the batteries or portions of the power source that are used may be generally interchangeable with each other, such that a replacement battery can be connected into a suitable port or socket that is exposed when a spent battery is removed. When configured so that the batteries also form part of the directional shielding assembly 120, removing a discharged battery also removes a part of the directional shielding assembly 120 and the installation of a charged battery also serves as installing a new part of the directional shielding assembly 120. In such examples, the directional shielding assembly 120 may be a collection of modular, interchangeable units each of which also forms part of the power source for the vehicle 100.

For example, in some embodiments, the first power source on the vehicle 100 may include a first and a second battery, one or both of which may be detachably connected to the body 105 of the vehicle 100. Each of the first and second battery may be detachably connected to the body 105 independently of the other battery and independently of the radiation detector 125, such that when one battery is detached from the body, the other battery and the radiation detector 125 may remain connected to the body.

In addition, in some embodiments, the first power source may include additional or auxiliary batteries (such as a third battery) that can be connectable to the body 105 (or any other suitable portion of the vehicle 100) in place of at least one of the first battery and second battery that is detachably connected to the body while the other of the first battery and the second battery remains connected to the body. When the auxiliary battery is connected to the body, the directional shielding assembly may include the third battery.

Referring again to FIGS. 4-6, in the illustrated example the vehicle 100 includes one example of a first power source 119 that includes four batteries 120a-d, each of which may include any number of suitable internal cells or power storage members. The batteries 120a-d in this example are connected to the lower side of the body 105. The batteries 120a-d can be connected to the body 105 using any suitable means, including brackets, clips, latches, housing enclosures and the like. For example, as shown in FIGS. 5 and 6, in this example, each battery 120a-d is connected to the lower side of the body 105 using an L-shaped bracket 122.

In this example, the batteries 120a-d are shown schematically as being generally rectangular and having substantially the same shape as each other. Alternatively, the batteries 120a-d may have other suitable configurations or shapes, and may be curved, hemispherical, or the like. Similarly, the batteries 120a-d need not have the same configuration as each other. In the present drawings, the electrical connectors to establish electrical connections between the batteries 120a-d and the rest of the vehicle 100 and mechanical fastening connections to hold the batteries 120a-d in place have not been shown in detail, but any suitable connectors and fasteners could be provided. Optionally, the electrical connectors on the batteries 120a-d may be provided on their upper end (as illustrated in FIGS. 5 and 6) because that end is in closest proximity to the body 105.

The mass of the first power source 119 may vary depending on the power requirements of the vehicle 100, the efficiency of the batteries 120a-d, and/or the radiation shielding requirements of a given radiation detector 125, amongst other factors. For example, the mass of the first power source 119 (e.g., the sum of the masses of batteries 120a-d in this example) may be between about 1 kg and about 20 kg or more. In some embodiments, such as in the case of some small UAVs, the mass of the first power source 119 may be less than 2 kg.

In embodiments in which the vehicle is a relatively small, and possibly relatively lightweight vehicle, such as the UAV 100 illustrated, the mass of the first power source 119 may form a relatively significant portion of the overall mass of the vehicle, as would a comparable mass of dedicated radiation shielding materials. For example, in some embodiments the first power source 119 may account for between about 1% and about 50% or more of the total mass of the vehicle 100 (i.e., the mass of the power source 119 divided by the mass of the total vehicle 100 including the power source 119). In other embodiments, the first power source 119 may be between about 5 and about 25% of the mass of the vehicle 100.

The size of the first power source 119 may also vary depending on the desired geometry for aerodynamic considerations, radiation shielding considerations, and the like. For example, when the batteries 120a-d or other portions of the first power source 119 are arranged to help provide the desired radiation shielding performance, they may be sized, shaped, and oriented in a manner that takes up relatively more space (i.e., is less spatially efficient) and/or that is less aerodynamically preferred than would be achievable if the batteries 120a-d were configured without having regard to the radiation blocking functions. While such an arrangement may be counter-intuitive, the weight and space savings achieved by the dual-purpose utilization of the power source 119 (as both power source and radiation shield) may be a net advantage to the vehicle design and/or performance in some embodiments.

Referring to FIGS. 5 and 6, in the illustrated example the batteries 120a-d forming the first power source 119 have a height 131 (i.e., length measured in the generally vertical or downward direction when the vehicle 100 is in use) that is preferably between about 5 cm and about 35 cm, and may be between about 10 cm and about 20 cm in some other embodiments.

The power source 119 may also define a lateral length 133 and width 137 in a plane that is generally orthogonal to the height direction (i.e., a generally horizontal plane when oriented as shown in FIGS. 5 and 6). In some embodiments, the length 133 and width 137 of the first power source 119 may be generally the same, and may be between about 2 cm and 15 cm in some embodiments, and may be between about 3 cm and 10 cm in some other embodiments.

In some embodiments, the size of the first power source is chosen to have a total mass and stored energy equivalent to the batteries found on a typical UAV of similar size and function. In some embodiments, the arrangement of the first power source may change the centre of gravity of the vehicle, as compared to the typical UAV. In some embodiments, such an arrangement may lower the centre of gravity of the vehicle, as compared to the typical UAV.

In the illustrated example, the size of the four batteries 120a-d is about 5 cm in lateral length 133 and width 137 and about 16.5 cm in height 131. In this arrangement, the directional radiation detection system 130 contains the overall centre of gravity of the vehicle 100.

When utilizing at least portions of the power source 119 in the directional shielding assembly 120, the overall configuration of the directional radiation detection system 130 may be based on a balance of convenience of installation and accessibility of the power source 119, as well as the desired shielding properties. Referring to FIGS. 4-6, in this example, the directional radiation detection system 130 is supported by the body 105 and includes the radiation detector 125 and the directional shielding assembly 120. The directional shielding assembly 120 is configured to partially shield the radiation detector 125 from a portion of incident radiation originating from a first incident direction from reaching it and, in this example, includes the four batteries 120a-d.

The directional shielding assembly 120 may, in some embodiments, be configured as a collimator-type detector having a radiation inlet that allows incident radiation passing through the radiation inlet to reach the radiation detector. In such embodiments, the directional shielding assembly may shield the radiation detector by attenuating incident radiation that passes through the first power source but does not pass through the radiation inlet.

Such directional shielding assemblies may define and extend along a collimator axis that extends from the inlet to the radiation detector at one end of the collimator. That is, the radiation inlet may be configured as a laterally extending aperture or portion that is axially opposite the radiation detector and may extend in a plane that is generally transverse the collimator axis. If the direction of detection of the directional radiation detection system 130 is to be generally aligned with the collimator axis then the directional shielding assembly 120 may entirely, or at least partially, laterally surround the collimator axis thereby blocking incident radiation that does not travel generally axially and/or through the lateral portion of the radiation inlet.

In the example illustrated in FIG. 4, the directional radiation detection system 130 is configured as one example of a collimator-type detector in which the four batteries 120a-d of the power source 119 are configured to extend in the generally axial direction (parallel to collimator axis 140) and are configured to entirely laterally surround the collimator axis 140 in a partially overlapping arrangement.

The configuration of the batteries relative to each other may vary. In the illustrated example, the batteries 120a-d are arranged in an offset, overlapping manner, such that a portion of one battery overlaps with a portion of the adjacent battery. For example, referring to FIG. 4, one side of battery 120a overlaps with battery 120b and a different side of battery 120a overlaps with battery 120d. Such an arrangement may provide increased radiation shielding than would be provided if the corners of each battery were lined up with the corner of the adjacent battery. Other arrangements could be used in other embodiments.

A radiation inlet 135 is defined, in this example, as a generally transverse aperture/opening at the lower end of the power source 119 that is bounded by the lower ends of the batteries 120a-d. In this arrangement the power source 119 provides the directional shielding assembly 120 that shields the radiation detector 125 from radiation originating from the front, rear, and sides of the vehicle 100 when it is in use, and generally limits the detector 125 to detecting radiation that is emitted from below the vehicle 100 and that passes generally axially in through the radiation inlet 135. That is, in such an arrangement, the four batteries 120a-d cooperate to laterally surround the radiation detector 125, forming a collimator. In this configuration, when the vehicle 100 is above a radiation source, the radiation detector 125 will primarily respond to radiation substantially below the radiation detector 125, within the area defined by the radiation inlet 135. In other words, the radiation inlet 135 allows incident radiation passing through the radiation inlet 135 to reach the radiation detector 125 and the directional shielding assembly 120 shields the radiation detector 125 by blocking incident radiation that does not pass through the radiation inlet.

In some embodiments, the width of the radiation inlet may be between about 0.5 cm and 10 cm, in some embodiments, the width of the radiation inlet may be between about 1 cm and 5 cm.

By altering the position of the batteries and radiation detector, directional shielding for the radiation detector may be formed without the need to add additional material to the vehicle. Using the batteries for multiple purposes (i.e., power source and shielding) may provide for directional radiation capability without adding substantial additional mass to the vehicle.

Preferably, the radiation detection vehicle 100 may include any suitable controller that is shown schematically as controller 144 in FIG. 6. The controller 144 may include a variety of suitable and desired modules and/or sensors (including hardware, software, firmware, and combinations thereof) that can help control the operation of the vehicle 100 as well as the radiation detection system 130. The controller 144 may include, for example, a process, CPU, memory, transceiver, accelerometer, gyroscope, pressure and velocity sensors, a communication module to communicate with a user/operator, a GPS and altimeter system to monitor an instantaneous threedimensional positioning of the vehicle 100 when in use, an electric compass or magnetometer, and other desired modules. The controller 144 may also be operable to associate an instantaneous directional radiation measurement with the instantaneous position of the vehicle 100. This may help facilitate determining the location of one or more sources of radiation within a given survey or measurement area, based on a relation between the vehicle position and the directional radiation measurement.

Figure 7:
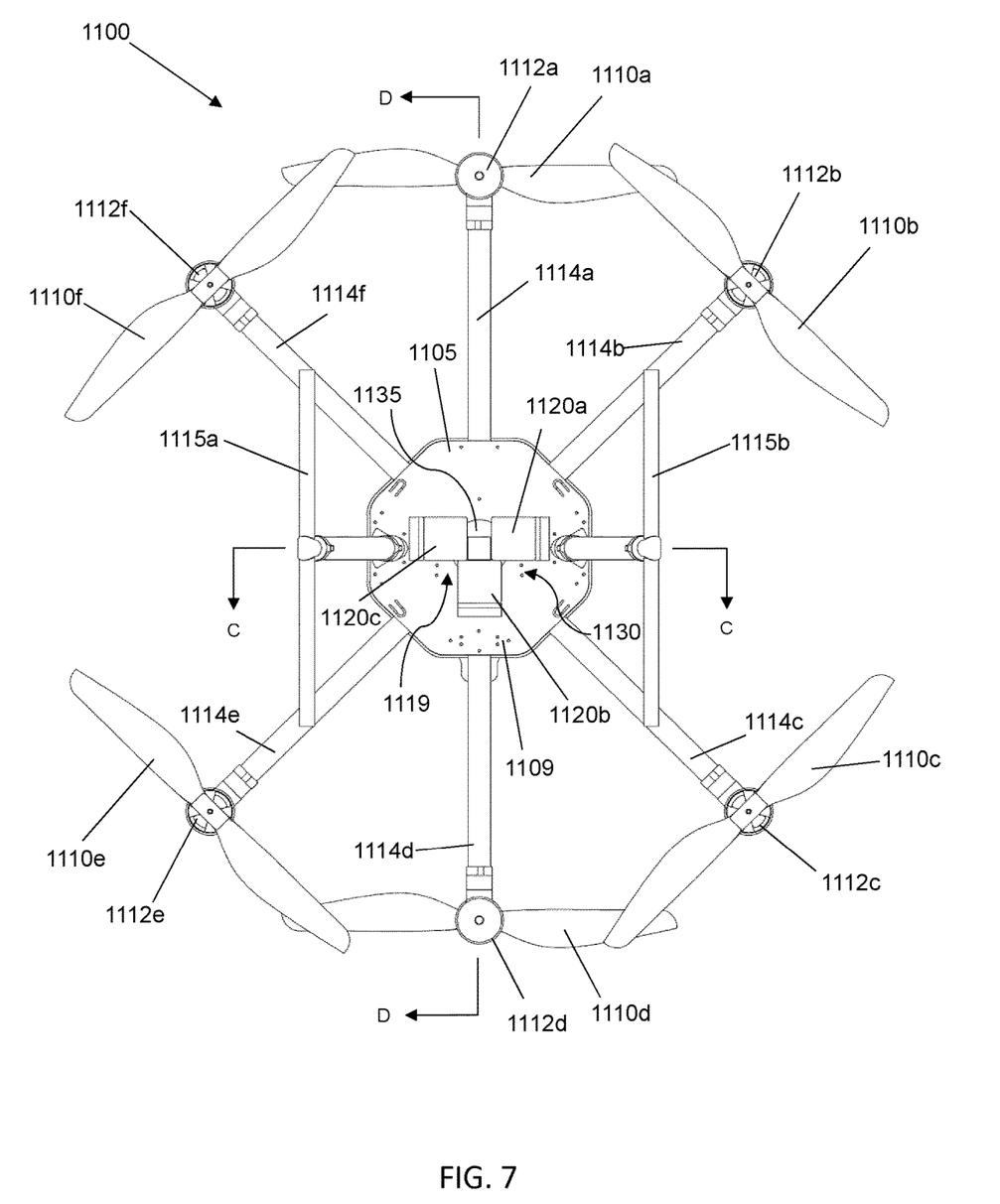
FIG. 7 is a bottom view of another example of a radiation detection vehicle with a directional radiation detection system.
Figure 8:
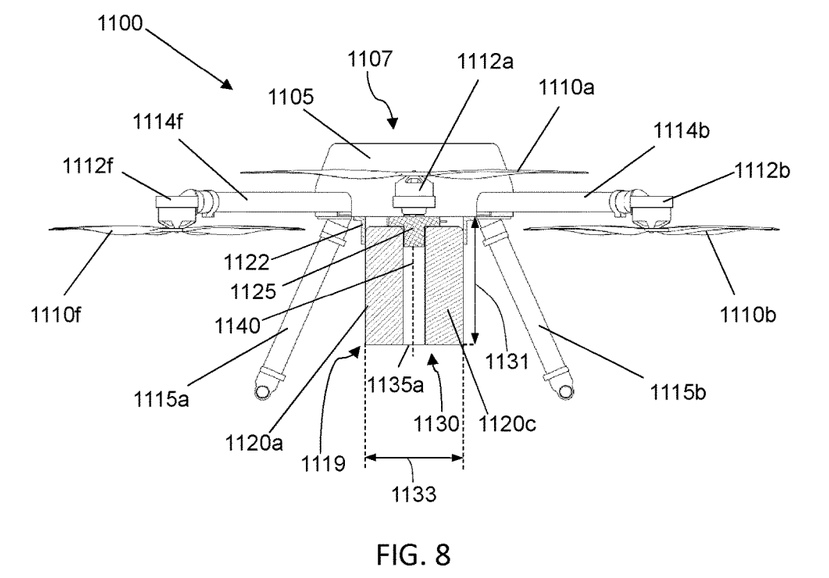
FIG. 8 is a front view of the radiation detection vehicle of FIG. 7, taken along line C-C, wherein a partial cross-section of the radiation detection system is shown.
Figure 9:
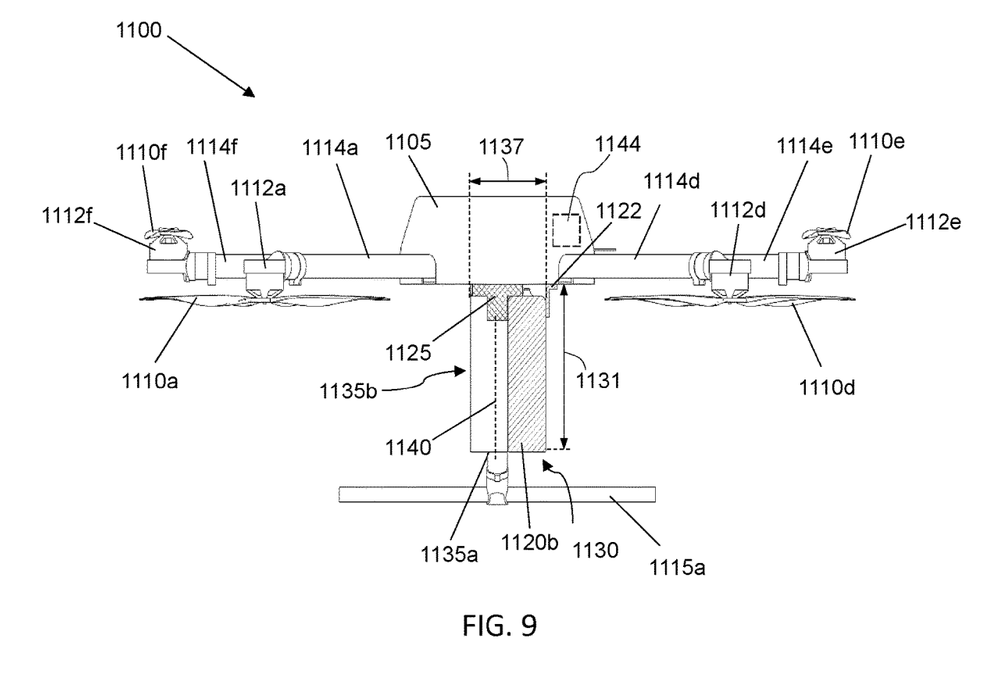
FIG. 9 is a side view of the radiation detection vehicle of FIG. 7, taken along line D-D, wherein a partial cross-section of the radiation detection system is shown.

FIGS. 7-9 illustrate an alternative embodiment of a radiation detection vehicle 1100 with a directional radiation detection system 1130, that is generally analogous to radiation detection vehicle 100 and directional radiation detection system 130, and in which analogous features are identified using like reference characters indexed by 1000.

In this embodiment, the radiation detection vehicle 1100 includes a body 1105 that has an upper side 1107 (FIG. 8) and a generally opposed lower side 1109 (FIG. 7). The illustrated vehicle has a landing gear component 1115, which includes a pair of legs 1115a, 1115b on opposing sides of the body 1105, and a controller 1144. A plurality of motors 1112a-f are supported by the body 1105 and are each configured to power a propeller 1110a-f, which in turn propels the vehicle 1100. Each motor-propeller combination is secured to the body 1105 by an arm 1114a-f.

The radiation detection vehicle 1100 also includes a directional radiation detection system 1130 that is supported on the lower side 1109 of the body 1105 and is generally downwardly facing. The directional radiation detection system 1130 includes a radiation detector 1125, which is configured to detect incident radiation, and a directional shielding assembly 1120.

In the illustrated example, the directional shielding assembly 1120 only partially laterally surrounds a collimator axis 1140, the collimator axis 1140 being defined by the directional shielding assembly 1120 and extending downwardly from the radiation detector 1125 (see FIG. 8).

The radiation inlet 1135, which allows radiation to reach the detector from a pre-defined direction, includes both a lateral portion 1135a, which may be axially opposite the radiation detector, and an axial portion 1135b, which lies in a plane that is generally parallel to the collimator axis 1140, extending axially from the lateral portion and being defined by a gap in the directional radiation shielding assembly 1120. In this arrangement, the directional shielding assembly 1120 blocks incident radiation that does not travel through at least one of the lateral portion 1135a and the axial portion 1135b of the radiation inlet 1135. In this illustrated example, the directional shielding assembly 1120 shields the radiation detector 1125 from radiation originating from the rear and sides of the vehicle 1100 when the vehicle 1100 is in use, and generally limits the detector 1125 to detecting radiation that is emitted from below and in front of the vehicle 1100. In other embodiments, depending on how the directional radiation shielding assembly 1120 is configured, the directional radiation shielding assembly 1120 may shield the radiation detector 1125 from radiation originating from the front and sides or from the front, rear, and one side of the vehicle 1100 when the vehicle 1100 is in use.

In the illustrated example, the directional shielding assembly 1120 includes a first power source 1119, that includes three batteries 1120a-c, each of which may include any number of suitable internal cells or power storage members. The batteries 1120a-c are connected to the lower side 1109 of the body 1105 using an L-shaped bracket 1122.

Referring to FIGS. 8 and 9, in the illustrated example, the size of the batteries 1120a-c forming the first power source 1119 is about 5 cm in lateral length 1133 and width 1137 and about 16.5 cm in height 1131.

Figure 10:
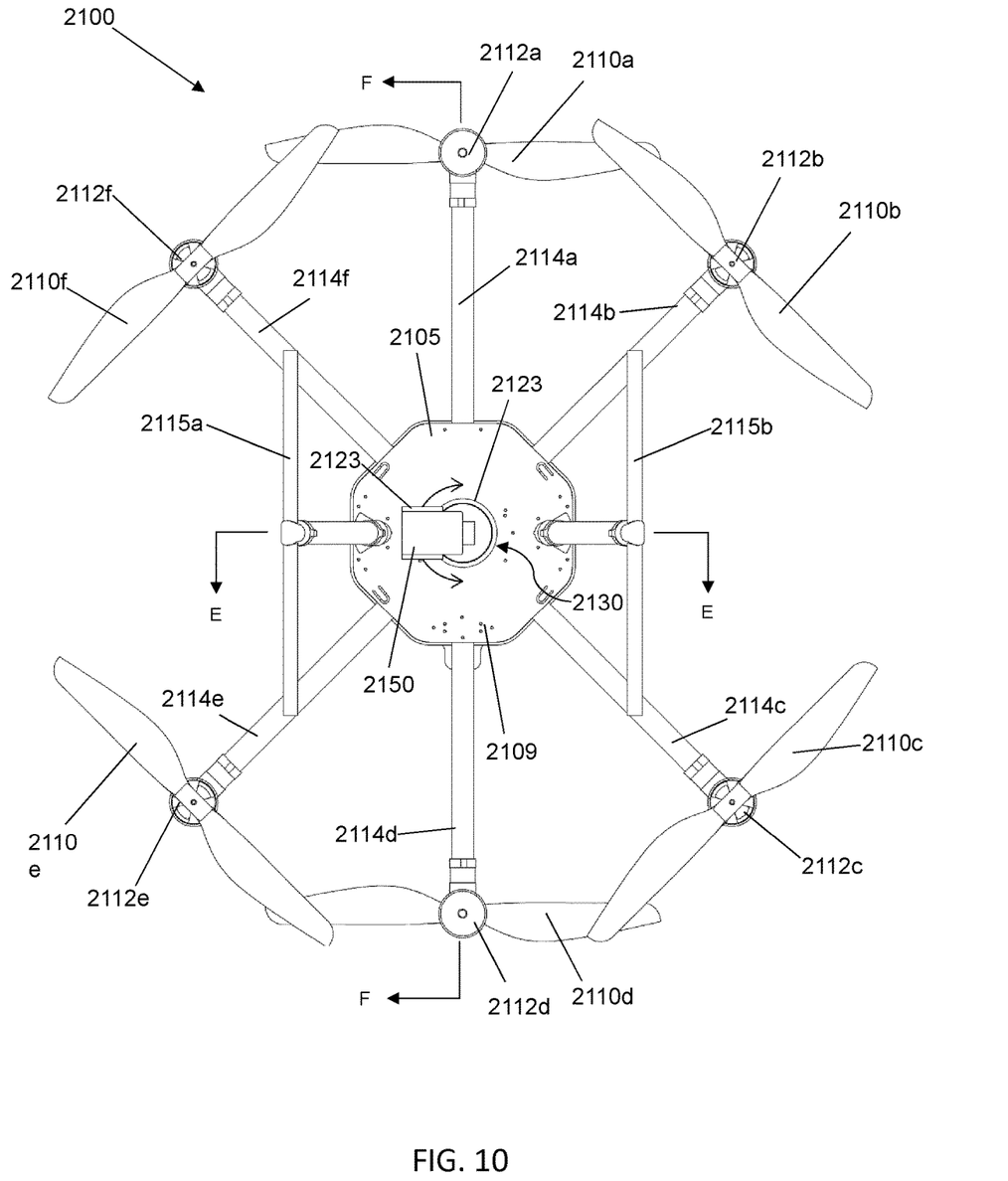
FIG. 10 is a bottom view of another example of a radiation detection vehicle with an inverse collimator radiation detection system.
Figure 11:
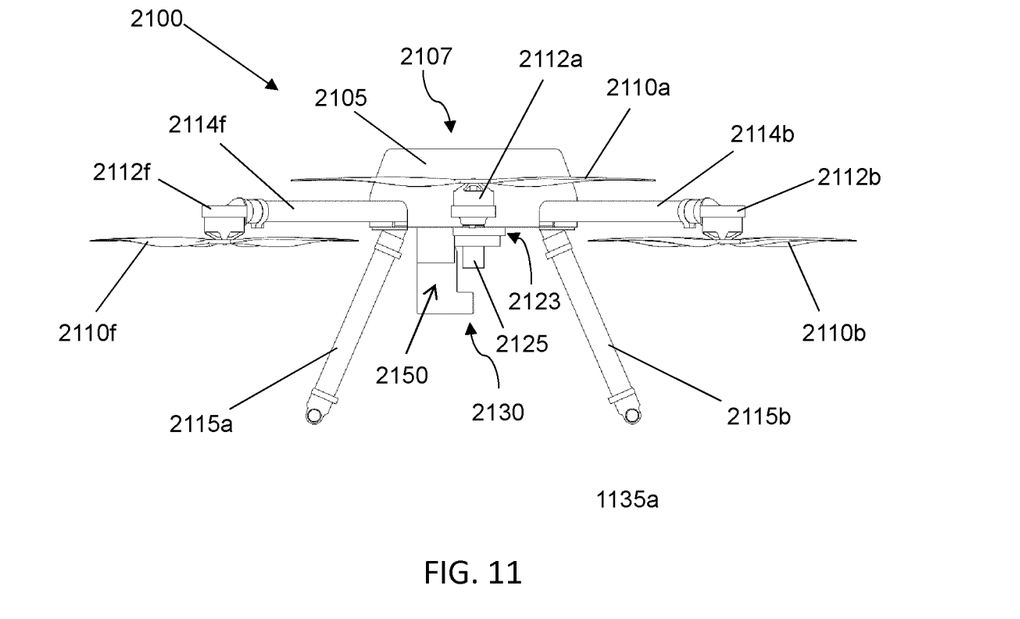
FIG. 11 is a front view of the radiation detection vehicle of FIG. 10, taken along line E-E.
Figure 12:
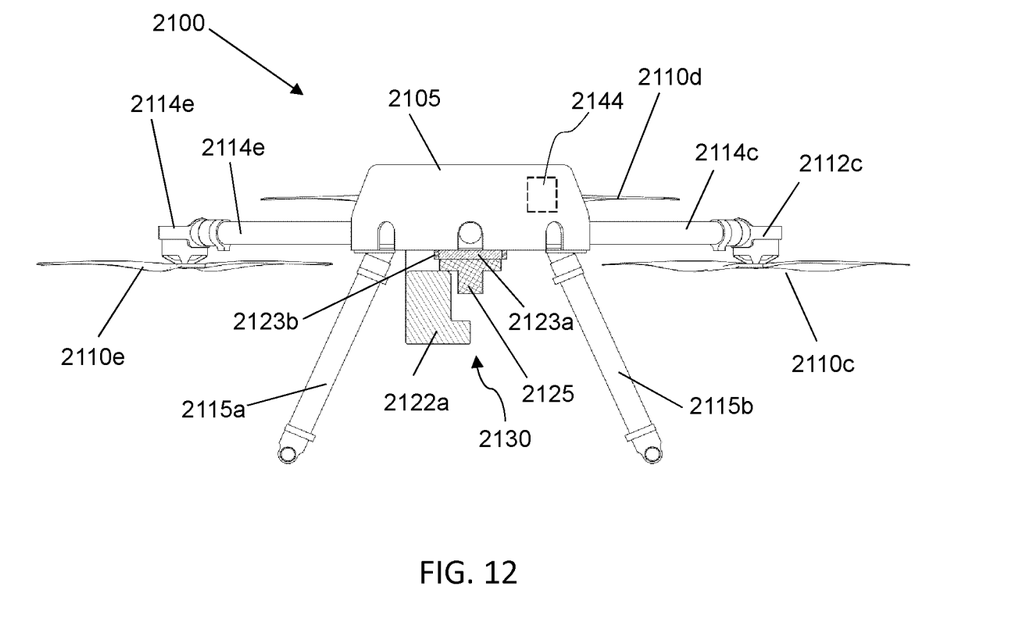
FIG. 12 is a front view of the radiation detection vehicle of FIG. 7, taken along line E-E, wherein a partial cross-section of the radiation detection system is shown and three arms (2114a, b, f) have been omitted for clarity.

In other embodiments, a directional radiation detection system may include a directional shielding assembly that is configured as an inverse collimator. FIGS. 10 to 12 illustrate another example of a radiation detection vehicle 2100 with a directional radiation detection system 2130, that is generally analogous to radiation detection vehicle 100 and directional radiation detection system 130, and in which analogous features are identified using like reference characters indexed by 2000.

In this example, the directional radiation detection system 2130 includes an inverse collimator that has a blocking member, which includes the radiation shielding material, in a limited area around the radiation detector thereby shielding the radiation detector from the portion of the incident radiation originating from the direction in which the blocking member is pointed. As the blocking member is moved relative to the detector, readings of the radiation magnitude and blocking member positioning can be recorded. The lowest radiation reading may generally correspond to when the blocking member is rotationally or otherwise aligned between the detector and the radiation source.

In the illustrated embodiment, the first power source (including at least a first battery 2120a) is configured to function as a blocking member 2150 that is movable relative to the radiation detector 2125, and that shields the radiation detector 2125 from at least a portion of incident radiation In this arrangement, when in a first position, the blocking member 2150 shields the radiation detector 2125 from incident radiation originating from a first direction but not incident radiation originating from a second, third, fourth, and so on direction. When the blocking member 2150 is moved to a second position, the blocking member 2150 shields the radiation detector 2125 from incident radiation originating from a second direction, whereas incident radiation originating from the first, third, fourth, and so on direction can reach the radiation detector 2125.

The movement of the blocking member 2150 relative to the radiation detector 2125 may be achieved by any suitable positioning apparatus. In the illustrated embodiment, the blocking member 2150 is mounted to a rotary mount 2123, which may include a drive motor (not shown) to rotate the blocking member 2150 about a desired axis around the radiation detector (see arrows in FIG. 10). The rotary mount 2123 may maintain electrical contact through a rotary joint.

In the illustrated embodiment, the rotary mount 2123 comprises a central static portion 2123a that is mountable to the body of the vehicle and is surrounded on its exterior face by an annular rotating portion 2123b (see FIG. 12). The rotary mount 2123 is secured to the lower side 2109 of the radiation detection vehicle 2100 and the radiation detector 2125 extends below the rotary mount 2123. The blocking member 2150 is secured to the rotating portion 2123b of the rotary mount 2123. As the rotating portion 2123b is moved around the static portion 2123a, the blocking member 2150 can therefore shield different portions of the radiation detector 2125 by attenuating the incident radiation that passes through it.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents, and patent applications referred to herein are incorporated by reference in their entirety to the same extent as if each individual publication, patent, or patent application was specifically and individually indicated to be incorporated by reference in its entirety.

What is claimed is:

1. A radiation detection vehicle comprising:
 a) a body;
 b) a motor supported by the body and configured to propel the vehicle;
 c) at least a first power source connectable to the body and configured to provide power to the vehicle; and
 d) a directional radiation detection system supported by the body and comprising:
  i. a radiation detector configured to detect incident radiation; and
  ii. a directional shielding assembly configured to partially shield the radiation detector by preventing a portion of the incident radiation originating from a first incident direction from reaching the radiation detector, the directional shielding assembly comprising the first power source.

2. The vehicle of claim 1, wherein the first power source provides power to at least one of the motor for driving the motor to propel the vehicle and the directional radiation detection system.

3. The vehicle of claim 1, wherein the first power source comprises between about 5% and about 25% of the mass of the vehicle.

4. The vehicle of claim 1, wherein the first power source comprises at least a first battery and a second battery.

5. The vehicle of claim 4, wherein at least one of the first battery and the second battery is detachably connected to the body.

6. The vehicle of claim 5, wherein the at least one of the first battery and the second battery that is detachably connected to the body is detachable while the radiation detector remains connected to the body.

7. The vehicle of claim 5, further comprising a third battery that is connectable to the body in place of the at least one of the first battery and the second battery that is detachably connected to the body while the other of the at least one of the first battery and the second battery remains connected to the body, and when the third battery is connected to the body, the directional shielding assembly comprises the third battery.

8. The vehicle of claim 4, wherein the directional shielding assembly is configured as a collimator having a radiation inlet that allows incident radiation passing through the radiation inlet to reach the radiation detector and that shields the radiation detector by attenuating incident radiation that passes through the first power source and does not pass through the radiation inlet.

9. The vehicle of claim 1, wherein the directional shielding assembly is configured as an inverse collimator in which the first power source is configured as a blocking member that is movable relative to the radiation detector and that shields the radiation detector by attenuating incident radiation originating from a direction in which the blocking member is pointed.

10. The vehicle of claim 1, wherein the vehicle is an aerial vehicle and the body has an upper side and an opposed lower side generally facing the ground when the aerial vehicle is in flight, and wherein a directional radiation detection system is provided on the lower side and is generally downwardly facing.

11. The vehicle of claim 1, wherein the directional radiation detection system contains a center of gravity of the vehicle.

12. The vehicle of claim 1, wherein the vehicle further comprises:
    e) a sensor system to monitor an instantaneous position of the vehicle when in use; and
    f) a controller operable to associate an instantaneous directional radiation measurement with the instantaneous position of the vehicle.

13. A directional radiation detection system for use in combination with a vehicle, the directional radiation detection system comprising:
    g) a radiation detector configured to detect incident radiation; and
    h) a directional shielding assembly configured to partially shield the radiation detector by preventing a portion of the incident radiation originating from a first incident direction from reaching the radiation detector, the directional shielding assembly comprising at least a first power source that is configured to provide power to the vehicle.

14. The system of claim 13, wherein the vehicle comprises a body and a motor supported by the body and configured to propel the vehicle and wherein the at least first power source is configured to provide power to the motor to propel the vehicle when in use.

15. The system of claim 14, wherein the first power source is the only source of power to the motor.

16. The system of claim 13, wherein the first power source comprises at least a first battery and a second battery.

17. The system of claim 16, wherein the directional shielding assembly is configured as a collimator having a radiation inlet that allows incident radiation passing through the radiation inlet to reach the radiation detector and that shields the radiation detector by attenuating incident radiation that passes through the first power source and does not pass through the radiation inlet.

18. The system of claim 17, wherein the directional shielding assembly extends along a collimator axis, and the radiation detector is at one end of the collimator and the radiation inlet comprises a lateral portion that is axially opposite the radiation detector.

19. The system of claim 18, wherein the lateral portion extends in a plane that is transverse the collimator axis and wherein the directional shielding assembly laterally surrounds the collimator axis thereby blocking incident radiation that does not travel through the lateral portion.

20. The system of claim 19, wherein the vehicle has a front side, an opposing rear side, and left and right sides, and wherein the first battery is disposed toward the front side, the second battery is disposed toward the rear side, and the directional shielding assembly comprises a third battery disposed toward the left side and a fourth battery disposed toward the right side, and wherein the first, second, third, and fourth batteries co-operate to laterally surround the collimator axis.

* * * * *